US009878679B2

(12) United States Patent
Salomonsson et al.

(10) Patent No.: US 9,878,679 B2
(45) Date of Patent: *Jan. 30, 2018

(54) VEHICLE VISION SYSTEM WITH WINDSHIELD MOUNTED CAMERA

(71) Applicant: MAGNA ELECTRONICS INC., Auburn Hills, MI (US)

(72) Inventors: Ove J. Salomonsson, Farmington Hills, MI (US); Christopher L. Van Dan Elzen, Rochester, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/494,646

(22) Filed: Apr. 24, 2017

(65) Prior Publication Data

US 2017/0225629 A1 Aug. 10, 2017

Related U.S. Application Data

(63) Continuation of application No. 15/180,643, filed on Jun. 13, 2016, now Pat. No. 9,630,570, which is a (Continued)

(51) Int. Cl.
*B60R 11/04* (2006.01)
*B60R 1/00* (2006.01)
(Continued)

(52) U.S. Cl.
CPC .............. *B60R 11/04* (2013.01); *B60Q 1/143* (2013.01); *B60R 1/00* (2013.01); *G02B 5/20* (2013.01);
(Continued)

(58) Field of Classification Search
None
See application file for complete search history.

(56) References Cited

U.S. PATENT DOCUMENTS 5,096,287 A * 3/1992 Kakinami ................. B60R 1/12
352/131
5,550,677 A 8/1996 Schofield et al.
(Continued)

FOREIGN PATENT DOCUMENTS

WO WO2010/111465 9/2010
WO WO2013/019795 2/2013
(Continued)

OTHER PUBLICATIONS

International Search Report and Written Opinion dated Jul. 23, 2012 for corresponding PCT Application No. PCT/US2012/34236.

*Primary Examiner* — Eileen Adams
(74) *Attorney, Agent, or Firm* — Gardner, Linn, Burkhart & Flory, LLP

(57) ABSTRACT

A vision system for a vehicle includes a camera module having a camera and a circuit board. With the camera module disposed at the windshield, the camera has a field of view forward of the vehicle and through the vehicle windshield. The camera includes (i) an imager and (ii) a lens. The camera is electrically connected to circuitry established at the circuit board via a flexible electrical connection. The circuitry, via the flexible electrical connection, provides power to the camera and receives image data from the camera, and may control the camera. With the camera module disposed at the windshield, the circuit board is angled relative to a principal axis of the field of view of the camera.

20 Claims, 3 Drawing Sheets

This area in front of lens is the stray light cone (shroud) to protect from dashboard reflections Camera lens aperture

Related U.S. Application Data continuation of application No. 14/112,343, filed as application No. PCT/US2012/034236 on Apr. 19, 2012, now Pat. No. 9,380,219.

(60) Provisional application No. 61/477,315, filed on Apr. 20, 2011.

(51) Int. Cl.

| | | |
|---|---|---|
| *B60Q 1/14* | (2006.01) | |
| *H04N 5/225* | (2006.01) | |
| *G02B 5/20* | (2006.01) | |
| *G03B 11/00* | (2006.01) | |
| *B60R 11/00* | (2006.01) | |

(52) U.S. Cl.
CPC ........... *G03B 11/00* (2013.01); *H04N 5/2252* (2013.01); *B60R 2011/0026* (2013.01); *B60R 2300/804* (2013.01); *B60R 2300/8093* (2013.01)

(56) References Cited

U.S. PATENT DOCUMENTS

| | | |
|---|---|---|
| 5,670,935 A | 9/1997 | Schofield et al. |
| 5,796,094 A | 8/1998 | Schofield et al. |
| 5,877,897 A | 3/1999 | Schofield et al. |
| 5,920,061 A | 7/1999 | Feng |
| 6,087,953 A | 7/2000 | DeLine et al. |
| 6,151,065 A | 11/2000 | Steed |
| 6,172,613 B1 | 1/2001 | DeLine et al. |
| 6,243,003 B1 | 6/2001 | DeLine et al. |
| 6,250,148 B1 | 6/2001 | Lynam |
| 6,259,475 B1 | 7/2001 | Ramachandran et al. |
| 6,278,377 B1 | 8/2001 | DeLine et al. |
| 6,326,613 B1 | 12/2001 | Heslin et al. |
| 6,396,397 B1 | 5/2002 | Bos et al. |
| 6,420,975 B1 | 7/2002 | DeLine et al. |
| 6,428,172 B1 | 8/2002 | Hutzel et al. |
| 6,445,287 B1 | 9/2002 | Schofield et al. |
| 6,498,620 B2 | 12/2002 | Schofield et al. |
| 6,690,268 B2 | 2/2004 | Schofield et al. |
| 6,824,281 B2 | 11/2004 | Schofield et al. |
| 7,004,593 B2 | 2/2006 | Weller et al. |
| 7,095,572 B2 | 8/2006 | Lee et al. |
| 7,215,479 B1 | 5/2007 | Bakin |
| 7,262,406 B2 | 8/2007 | Heslin et al. |
| 7,265,342 B2 | 9/2007 | Heslin et al. |
| 7,289,037 B2 | 10/2007 | Uken et al. |
| 7,420,159 B2 | 9/2008 | Heslin et al. |
| 7,480,149 B2 | 1/2009 | DeWard et al. |
| 7,533,998 B2 | 5/2009 | Schofield et al. |
| 7,536,316 B2 | 5/2009 | Ozer et al. |
| 7,728,721 B2 | 6/2010 | Schofield et al. |
| 7,888,629 B2 | 2/2011 | Heslin et al. |
| 7,916,009 B2 | 3/2011 | Schofield et al. |
| 7,918,570 B2 | 4/2011 | Weller et al. |
| 7,965,336 B2 | 6/2011 | Bingle et al. |
| 8,194,133 B2 | 6/2012 | DeWind et al. |
| 8,223,203 B2 | 7/2012 | Ohsumi et al. |
| 8,256,821 B2 | 9/2012 | Lawlor et al. |
| 8,531,278 B2 | 9/2013 | DeWard et al. |
| 9,380,219 B2 * | 6/2016 | Salomonsson ............ B60R 1/00 |
| 9,630,570 B2 * | 4/2017 | Salomonsson ............ B60R 1/00 |
| 2005/0083590 A1 | 4/2005 | Tanigawa |
| 2005/0141106 A1 | 6/2005 | Lee et al. |
| 2006/0077575 A1 | 4/2006 | Nakai et al. |
| 2006/0103727 A1 | 5/2006 | Tseng |
| 2006/0202038 A1 * | 9/2006 | Wang ................ G06K 7/10732 235/462.24 |
| 2007/0221826 A1 * | 9/2007 | Bechtel ................ G02B 3/005 250/208.1 |
| 2008/0252882 A1 * | 10/2008 | Kesterson ............. G02B 5/208 356/300 |
| 2009/0295181 A1 | 12/2009 | Lawlor et al. |
| 2010/0110192 A1 | 5/2010 | Johnston et al. |
| 2010/0134616 A1 | 6/2010 | Seger et al. |
| 2010/0279439 A1 | 11/2010 | Shah et al. |
| 2010/0283581 A1 | 11/2010 | Heigl |
| 2011/0025850 A1 | 2/2011 | Maekawa et al. |
| 2011/0035120 A1 * | 2/2011 | Taylor ................ B60C 23/0408 701/49 |
| 2012/0069185 A1 | 3/2012 | Stein |
| 2012/0081550 A1 | 4/2012 | Sewell |
| 2012/0265416 A1 | 10/2012 | Lu |
| 2014/0015977 A1 | 1/2014 | Taylor |

FOREIGN PATENT DOCUMENTS

| | | |
|---|---|---|
| WO | WO2013/081984 | 6/2013 |
| WO | WO2013/123161 | 8/2013 |

\* cited by examiner

VEHICLE VISION SYSTEM WITH WINDSHIELD MOUNTED CAMERA

CROSS REFERENCE TO RELATED APPLICATIONS

The present application is a continuation of U.S. patent application Ser. No. 15/180,643, filed Jun. 13, 2016, now U.S. Pat. No. 9,630,570, which is a continuation of U.S. patent application Ser. No. 14/112,343, filed Oct. 17, 2013, now U.S. Pat. No. 9,380,219, which is a 371 national phase filing of PCT/US12/34236, filed Apr. 19, 2012, which claims the filing benefit of U.S. provisional application Ser. No. 61/477,315, filed Apr. 20, 2011, which is hereby incorporated herein by reference in its entirety.

FIELD OF THE INVENTION

The present invention relates to imaging systems or vision systems for vehicles.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vision system or imaging system for a vehicle that utilizes one or more cameras to capture images exterior of the vehicle, and provides the communication/data signals, including camera data or image data, that may be processed by an image processor, such as for a headlamp control or other machine vision system, or that may be displayed at a display screen that is viewable by the driver of the vehicle.

According to an aspect of the present invention, a vision system for a vehicle includes a camera or image sensor disposed at a windshield of a vehicle and having a field of view forward of the vehicle and through the windshield of the vehicle, and a processor operable to process data transmitted by the camera. The vision system or camera assembly or system includes an angular filter disposed at or near the windshield forward of the camera. The angular filter comprises a substantially transparent film that limits reflection of light through an angular range that generally corresponds to the stray light that reflects off of the vehicle (such as off of the vehicle dashboard) and would otherwise impinge the camera lens aperture.

The camera is electrically connected to circuitry established at a circuit board that is mounted generally along the windshield behind the camera, and the camera preferably is electrically connected to the circuitry via a flexible electrical connector. The flexible electrical connector flexes to allow a viewing angle of the camera to be adjusted relative to a mounting angle of the circuit board.

Therefore, the present invention provides an angular light filter that rejects or substantially rejects or attenuates reflections from the vehicle dash board into the camera. The angular filter replaces the stray light cone or shroud of a typical module or housing, allowing greater flexibility and lower mounting of the camera at the windshield.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a forward (or rearward) direction.

Figure 1:
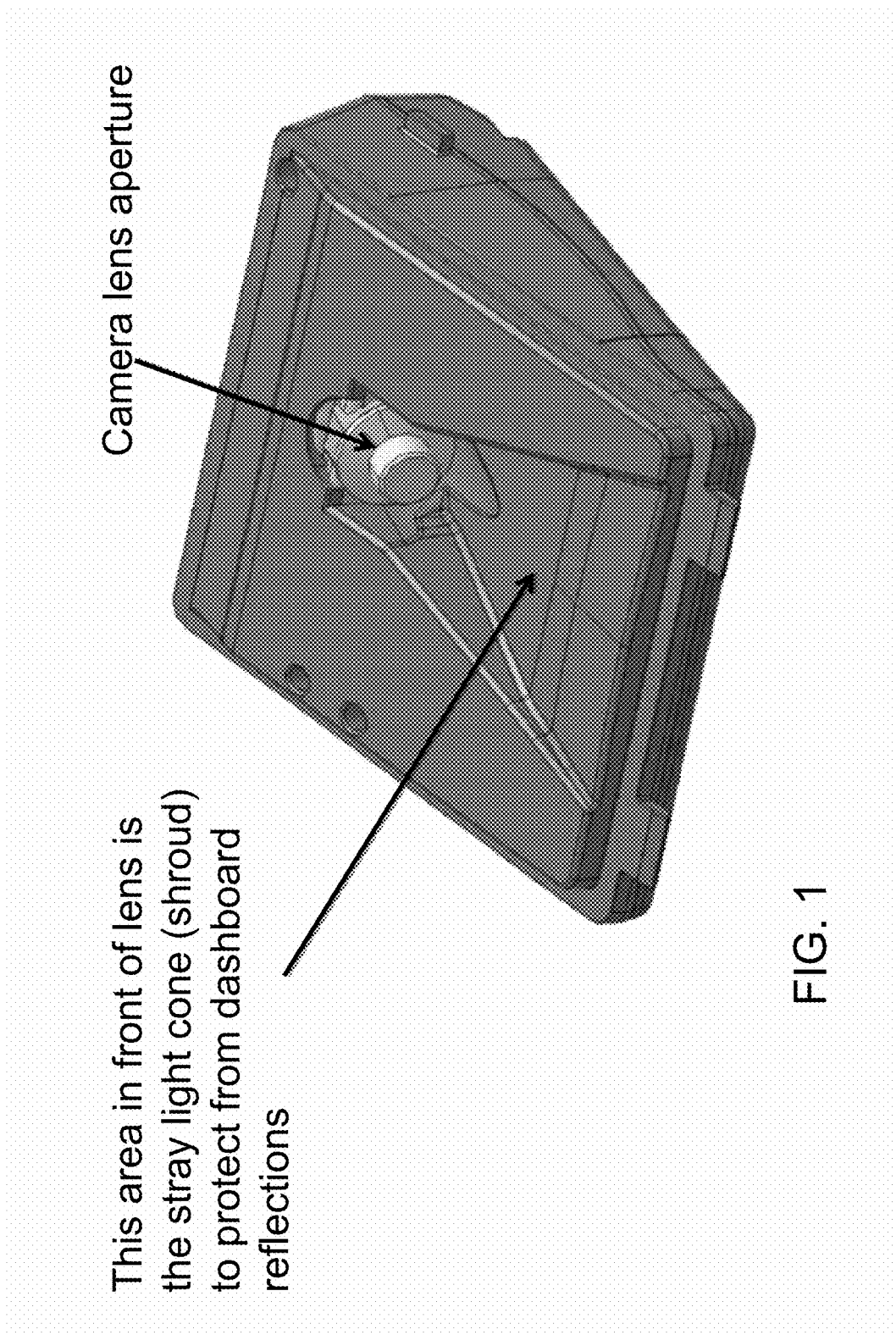
FIG. 1 is a perspective view of a camera disposed at a module that attaches at an interior surface of a vehicle windshield and that includes a stray light cone in front of the camera as part of the module or housing.
Figure 2:
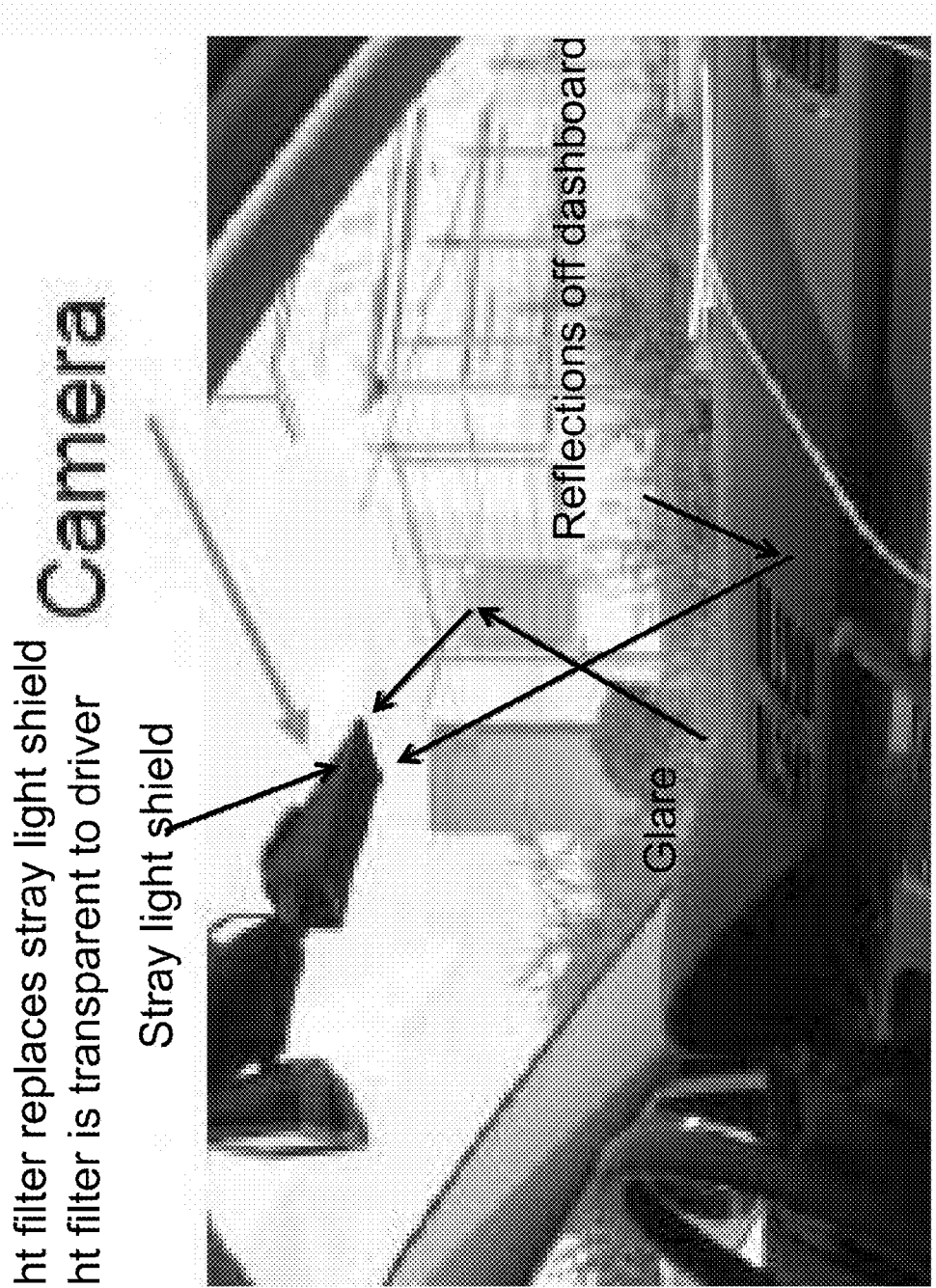
FIG. 2 is a perspective view of the camera module of FIG. 1, shown with the module mounted at a vehicle windshield with the stray light cone extending forward from the camera and along the windshield.

Front facing vehicular cameras include optical elements that constitute the camera. These elements are typically mounted in a vehicular camera housing, such as a windshield electronics module housing or the like, such as shown in FIGS. 1 and 2 (and such as a housing that utilizes aspects of the vision systems described in U.S. Pat. Nos. 7,526,103; 7,480,149; 7,188,963; 6,824,281; 6,341,523; 6,250,148; 6,516,664 and/or 6,968,736, which are hereby incorporated herein by reference in their entireties). As can be seen with reference to FIGS. 1 and 2, the housing may extend forward of the camera lens aperture and includes a stray light cone or shroud which serves to insulate the camera lens aperture from stray light that arises from reflections off the dashboard and/or windshield. Such housings are typically relatively bulky compared to the optical elements of the camera and thus the housing may occupy a considerable amount of windshield real estate or space. It thus may be desirable to eliminate the housing, or at least minimize the extent of the camera housing, so as to free up space on the windshield. This would not only provide better aesthetics, but also increased visibility through the windshield for the driver of the vehicle.

Figure 3:
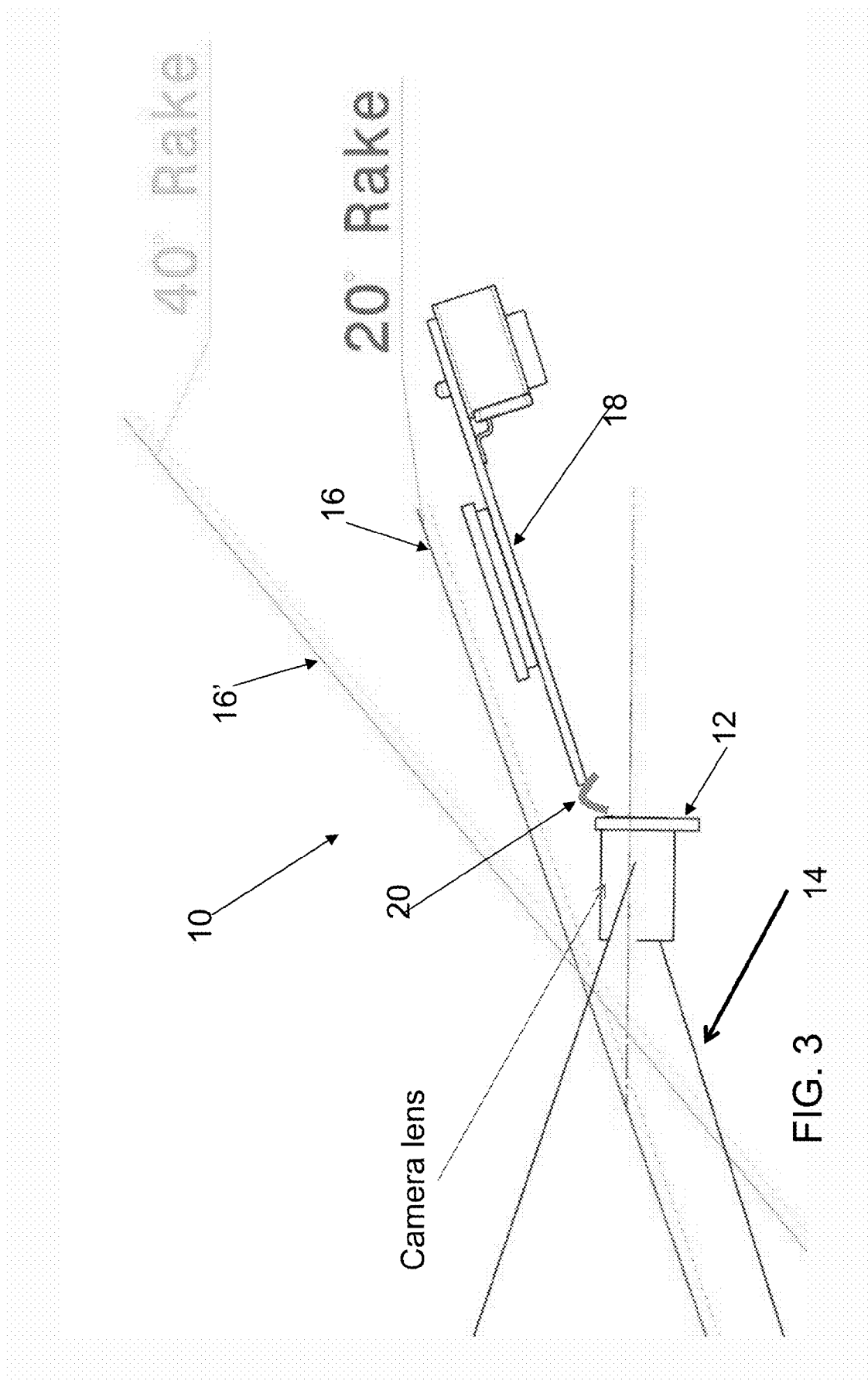
FIG. 3 is a sectional view of a camera assembly or system with an angular light filter disposed along the windshield in front of the camera in accordance with the present invention.

As shown in FIG. 3, the present invention proposes to eliminate the stray light cone or shroud and minimize the camera housing so that the housing only contains the optical elements of the camera and any necessary interfacing elements. At the very least, the present invention seeks to eliminate the stray light cone or shroud so that there is a minimum of the camera housing projecting forward of the camera lens aperture. Instead of a stray light cone or shroud, the camera or vision system 10 of the present invention includes a camera 12, with an angular filter 14 placed on or near the windshield 16 forward of the camera 12 and the camera lens aperture (and not part of or incorporated in a camera housing of a windshield electronics module or the like). The angular filter 14 comprises a transparent (or substantially transparent or light transmitting) or see-through film, which limits or substantially precludes reflection of light through an angular range corresponding to the stray light that would otherwise impinge the camera lens aperture.

The angular filter 14 may comprise any suitable materials. For example, a suitable film material may be found on the likes of computer notebook screens and other types of display monitors and are commercially available from the 3M Company and other suppliers. In some embodiments, the filter may be placed directly on the windshield, and in other embodiments (and such as shown in FIG. 3) the filter may be spaced apart from the windshield surface on a plane just below the camera lens aperture, in which case the filter may be mounted on a transparent substrate (not shown) or the like. Optionally, the filter may be provided in the form of anti-reflective coating on the windshield, which acts to prevent reflections from the windshield.

With the proposed structure, the designer of the camera system or vision system is afforded a great deal of design flexibility. In particular, and as can be seen with reference to FIG. 3, it will be appreciated that the printed circuit board 18 and other electronic components may be housed and disposed rearward of the camera optical elements and placed higher up on or along or near the windshield or even hidden all together under the vehicle roof liner.

Optionally, and as shown in FIG. 3, a flexible coupling 20 may also be provided between the small camera 12 and the printed circuit board 18. With such a flexible coupling (which electrically connects circuitry of the circuit board with circuitry of the camera to power and/or control the camera and to receive image data from the camera), the present invention may provide a universal or substantially universal solution to many vehicles which may all have different windshield rake angles. For example, and as can be seen with reference to FIG. 3, the flexible coupling 20 may flex to allow the camera 12 to be arranged generally horizontally when the circuit board 18 is mounted along (and generally parallel to) the windshield 16, such as, for example, along a windshield that has a rake angle of about 20 degrees, and the flexible coupling 20 may be adjusted or flexed to allow the camera 12 to be arranged generally horizontally when the circuit board 18 is mounted along a different windshield 16', such as, for example, along a windshield that has a rake angle of about 40 degrees. The flexible electrical connector thus flexes to allow a viewing angle of the camera to be adjusted relative to a mounting angle of the circuit board, depending on the particular vehicle application of the camera system. Thus, a common camera assembly or system 10 may be provided that may readily be adapted or configured for application to vehicles with different windshield angles (with the flexible coupling or flex connection allowing for adjustment of the angular tilt or relative angles between the camera and lens axis and the circuit board), without requiring additional mounting bracketry and the like to adapt the assembly to the particular vehicle.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. provisional application Ser. No. 61/565,713, filed Dec. 1, 2011; and/or Ser. No. 61/563,965, filed Nov. 28, 2011, which are hereby incorporated herein by reference in their entireties.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, an array of a plurality of photosensor elements arranged in 640 columns and 480 rows (a 640×480 imaging array), with a respective lens focusing images onto respective portions of the array. The photosensor array may comprise a plurality of photosensor elements arranged in a photosensor array having rows and columns. The logic and control circuit of the imaging sensor may function in any known manner, such as in the manner described in U.S. Pat. Nos. 5,550,677; 5,877,897; 6,498,620; 5,670,935; 5,796,094 and/or 6,396,397, and/or U.S. provisional applications, Ser. No. 61/615,410, filed Mar. 26, 2012; Ser. No. 61/613,651, filed 2012; Ser. No. 61/607,229, filed Mar. 6, 2012; Ser. No. 61/605,409, filed Mar. 1, 2012; Ser. No. 61/602,878, filed Feb. 24, 2012; Ser. No. 61/602,876, filed Feb. 24, 2012; Ser. No. 61/600,205, filed Feb. 17, 2012; Ser. No. 61/588,833, filed Jan. 20, 2012; Ser. No. 61/583,381, filed Jan. 5, 2012; Ser. No. 61/579,682, filed Dec. 23, 2011; Ser. No. 61/570,017, filed Dec. 13, 2011; Ser. No. 61/568,791, filed Dec. 9, 2011; Ser. No. 61/567,446, filed Dec. 6, 2011; Ser. No. 61/559,970, filed Nov. 15, 2011; Ser. No. 61/552,167, filed Oct. 27, 2011; Ser. No. 61/540,256, filed Sep. 28, 2011; Ser. No. 61/513,745, filed Aug. 1, 2011; Ser. No. 61/511,738, filed Jul. 26, 2011; and/or Ser. No. 61/503,098, filed Jun. 30, 2011, which are all hereby incorporated herein by reference in their entireties. The system may communicate with other communication systems via any suitable means, such as by utilizing aspects of the systems described in PCT Application No. PCT/US10/038477, filed Jun. 14, 2010, and/or U.S. patent application Ser. No. 13/202,005, filed Aug. 17, 2011, now U.S. Pat. No. 9,126,525, and/or U.S. provisional applications, Ser. No. 61/567,150, filed Dec. 6, 2011; Ser. No. 61/565,713, filed Dec. 1, 2011; and/or Ser. No. 61/537,279, filed Sep. 21, 2011, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and 6,824,281, and/or International Publication No. WO 2010/099416, published Sep. 2, 2010, and/or PCT Application No. PCT/US10/47256, filed Aug. 31, 2010, and/or U.S. patent application Ser. No. 12/508,840, filed Jul. 24, 2009, and published Jan. 28, 2010 as U.S. Pat. Publication No. US 2010-0020170; and/or U.S. provisional applications, Ser. No. 61/511,738, filed Jul. 26, 2011; and/or Ser. No. 61/503,098, filed Jun. 30, 2011, which are all hereby incorporated herein by reference in their entireties. The camera or cameras may comprise any suitable cameras or imaging sensors or camera modules, and may utilize aspects of the cameras or sensors described in U.S. patent application Ser. No. 12/091,359, filed Apr. 24, 2008; and/or Ser. No. 13/260,400, filed Sep. 26, 2011, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097, 023; 6,320,176; 6,559,435; 6,831,261; 6,806,452; 6,396, 397; 6,822,563; 6,946,978; 7,339,149; 7,038,577; 7,004,606 and/or 7,720,580, and/or U.S. patent application Ser. No. 10/534,632, filed May 11, 2005, now U.S. Pat. No. 7,965, 336; and/or PCT Application No. PCT/US2008/076022, filed Sep. 11, 2008 and published Mar. 19, 2009 as International Publication No. WO/2009/036176, and/or PCT Application No. PCT/US2008/078700, filed Oct. 3, 2008 and published Apr. 9, 2009 as International Publication No. WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526, 103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877, 897; 5,949,331; 6,222,447; 6,302,545; 6,396,397; 6,498, 620; 6,523,964; 6,611,202; 6,201,642; 6,690,268; 6,717, 610; 6,757,109; 6,802,617; 6,806,452; 6,822,563; 6,891, 563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. patent application Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. patent application Ser. No. 10/538,724, filed Jun. 13, 2005 and published Mar. 9, 2006 as U.S. Publication No. US-2006-0050018-A1, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. patent application Ser. No. 11/226, 628, filed Sep. 14, 2005 and published Mar. 23, 2006 as U.S. Publication No. US-2006-0061008, and/or Ser. No. 12/578, 732, filed Oct. 14, 2009 and published Apr. 22, 2010 as U.S. Publication No. US-2010-0097469, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370, 983; 7,329,013; 7,308,341; 7,289,037; 7,249,860; 7,004, 593; 4,546,551; 5,699,044; 4,953,305; 5,576,687; 5,632, 092; 5,677,851; 5,708,410; 5,737,226; 5,802,727; 5,878, 370; 6,087,953; 6,173,508; 6,222,460; 6,513,252 and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety). Optionally, the vision system (utilizing a forward and/or rearward facing camera and other cameras disposed at the vehicle with exterior fields of view) and/or the camera or cameras as part of a vehicle vision system comprising or utilizing a plurality of cameras (such as utilizing a rearward facing camera and sidewardly facing cameras and a forwardly facing camera disposed at the vehicle), may provide a display of a top-down view or birds-eye view of the vehicle or a surround view at the vehicle, such as by utilizing aspects of the vision systems described in PCT Application No. PCT/US10/25545, filed Feb. 26, 2010 and published on Sep. 2, 2010 as International Publication No. WO 2010/ 099416, and/or PCT Application No. PCT/US10/47256, filed Aug. 31, 2010 and published Mar. 10, 2011 as International Publication No. WO 2011/028686, and/or PCT Application No. PCT/US11/62834, filed Dec. 1, 2011 and published Jun. 7, 2012 as International Publication No. WO 2012-075250, and/or U.S. patent application Ser. No. 13/333,337, filed Dec. 21, 2011, now U.S. Pat. No. 9,264, 672, and/or U.S. provisional applications, Ser. No. 61/615, 410, filed Mar. 26, 2012; Ser. No. 61/588,833, filed Jan. 20, 2012; Ser. No. 61/570,017, filed Dec. 13, 2011; Ser. No. 61/568,791, filed Dec. 9, 2011; Ser. No. 61/559,970, filed Nov. 15, 2011; Ser. No. 61/540,256, filed Sep. 28, 2011, which are hereby incorporated herein by reference in their entireties.

Optionally, the video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent application Ser. No. 12/091,525, filed Apr. 25, 2008, now U.S. Pat. No. 7,855,755; Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vision system for a vehicle, said vision system comprising:
 a camera module disposed at a windshield of a vehicle;
 wherein said camera module comprises a camera and a circuit board;
 wherein, with said camera module disposed at the windshield, said camera has a field of view forward of the vehicle and through the windshield of the vehicle;
 wherein said camera comprises (i) an imager comprising a plurality of photosensor elements arranged in multiple columns and multiple rows and (ii) a lens;
 wherein said camera is electrically connected to circuitry established at said circuit board;
 wherein said camera is electrically connected to said circuitry established at said circuit board via a flexible electrical connection;
 wherein, via said flexible electrical connection, said circuitry established at said circuit board (i) provides power to said camera, (ii) controls said camera and (iii) receives image data from said camera; and
 wherein, with said camera module disposed at the windshield, said circuit board is angled relative to a principal axis of the field of view of said camera.

2. The vision system of claim 1, comprising an image processor operable to process image data captured by said camera.

3. The vision system of claim 2, wherein said image processor comprises part of a driver assistance system of the vehicle.

4. The vision system of claim 3, wherein said driver assistance system comprises at least one of (i) a vehicle headlamp control system of the vehicle, (ii) a lane change assistance system of the vehicle, (iii) a lane departure warning system of the vehicle, (iv) an object detection system of the vehicle and (v) a traffic sign recognition system of the vehicle.

5. The vision system of claim 3, wherein said driver assistance system comprises a distance determining system operable to determine distance to a leading vehicle.

6. The vision system of claim 1, wherein, with said camera module disposed at the windshield, the principal axis of the field of view of said camera is generally horizontal.

7. The vision system of claim 1, wherein, with said camera module disposed at the windshield, at least a portion of said circuit board is disposed at the windshield further from the windshield than said lens of said camera.

8. The vision system of claim 1, wherein, with said camera module disposed at the windshield, at least a portion of said circuit board is disposed at the windshield higher up than said lens of said camera.

9. The vision system of claim 1, wherein, with said camera module disposed at the windshield, said circuit board is disposed under a roof liner of the vehicle.

10. A vision system for a vehicle, said vision system comprising:
 a camera module disposed at a windshield of a vehicle;
 wherein said camera module comprises a camera and a circuit board;
 wherein, with said camera module disposed at the windshield, said camera has a field of view forward of the vehicle and through the windshield of the vehicle;
 wherein said camera comprises (i) an imager comprising a plurality of photosensor elements arranged in multiple columns and multiple rows and (ii) a lens;
 wherein said camera is electrically connected to circuitry established at said circuit board;
 wherein said camera is electrically connected to said circuitry established at said circuit board via a flexible electrical connection;
 wherein, via said flexible electrical connection, said circuitry established at said circuit board (i) provides power to said camera and (ii) receives image data from said camera;
 an image processor operable to process image data captured by said camera;
 wherein said image processor comprises part of a driver assistance system of the vehicle; and wherein said driver assistance system comprises a distance determining system operable to determine distance to a leading vehicle.

11. The vision system of claim 10, wherein said driver assistance system comprises a vehicle headlamp control system of the vehicle.

12. The vision system of claim 11, wherein said driver assistance system comprises a lane change assistance system of the vehicle.

13. The vision system of claim 12, wherein said driver assistance system comprises a traffic sign recognition system of the vehicle.

14. The vision system of claim 10, wherein, with said camera module disposed at the windshield, at least a portion of said circuit board is disposed at the windshield further from the windshield than said lens of said camera.

15. The vision system of claim 14, wherein, via said flexible electrical connection, said circuitry established at said circuit board controls said camera.

16. A vision system for a vehicle, said vision system comprising:
   a camera module disposed at a windshield of a vehicle;
   wherein said camera module comprises a camera and a circuit board;
   wherein, with said camera module disposed at the windshield, said camera has a field of view forward of the vehicle and through the windshield of the vehicle;
   wherein said camera comprises (i) an imager comprising a plurality of photosensor elements arranged in multiple columns and multiple rows and (ii) a lens;
   wherein said camera is electrically connected to circuitry established at said circuit board;
   wherein said camera is electrically connected to said circuitry established at said circuit board via a flexible electrical connection;
   wherein, via said flexible electrical connection, said circuitry established at said circuit board (i) provides power to said camera, (ii) controls said camera and (iii) receives image data from said camera;
   wherein said camera comprises a CMOS camera; and
   wherein, with said camera module disposed at the windshield, at least a portion of said circuit board is disposed at the windshield further from the windshield than said lens of said camera.

17. The vision system of claim 16, comprising an image processor operable to process image data captured by said camera wherein said image processor comprises part of a driver assistance system of the vehicle.

18. The vision system of claim 17, wherein said driver assistance system comprises at least one of (i) an object detection system of the vehicle, (ii) a traffic sign recognition system of the vehicle and (iii) a distance determining system operable to determine distance to a leading vehicle.

19. The vision system of claim 18, wherein said driver assistance system comprises at least one of (i) a vehicle headlamp control system of the vehicle, (ii) a lane change assistance system of the vehicle and (iii) a lane departure warning system of the vehicle.

20. The vision system of claim 19, wherein, with said camera module disposed at the windshield, at least a portion of said circuit board is disposed at the windshield higher up than said lens of said camera.

* * * * *